March 6, 1973   J. F. FINGER   3,719,793
WELDING HELMET
Filed March 4, 1971
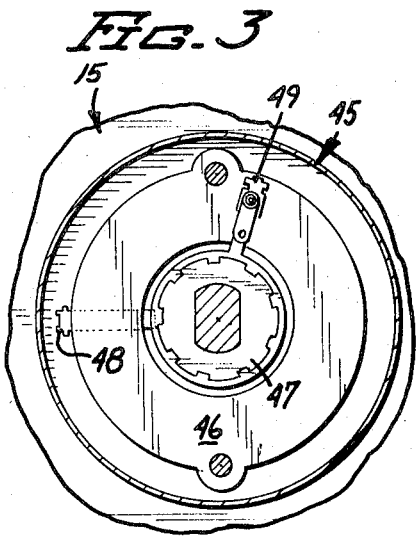
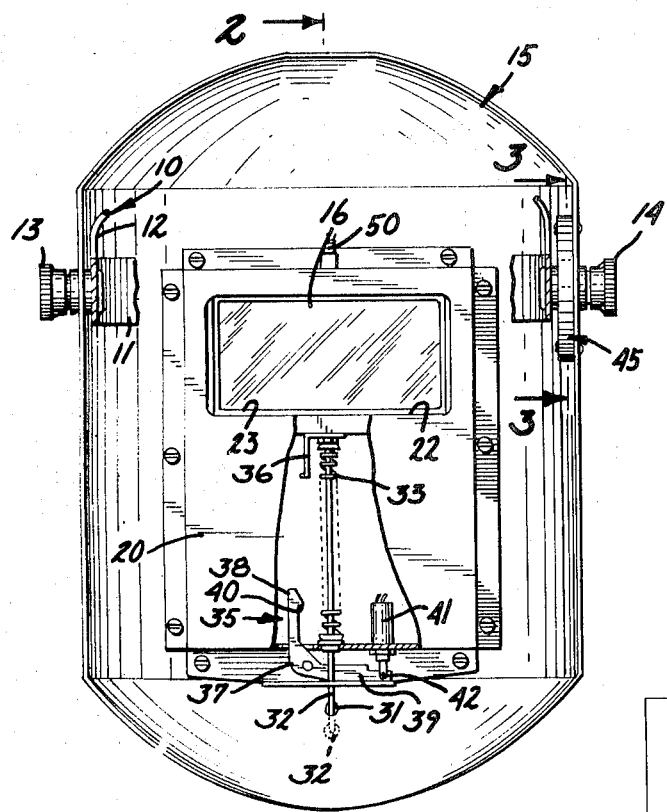
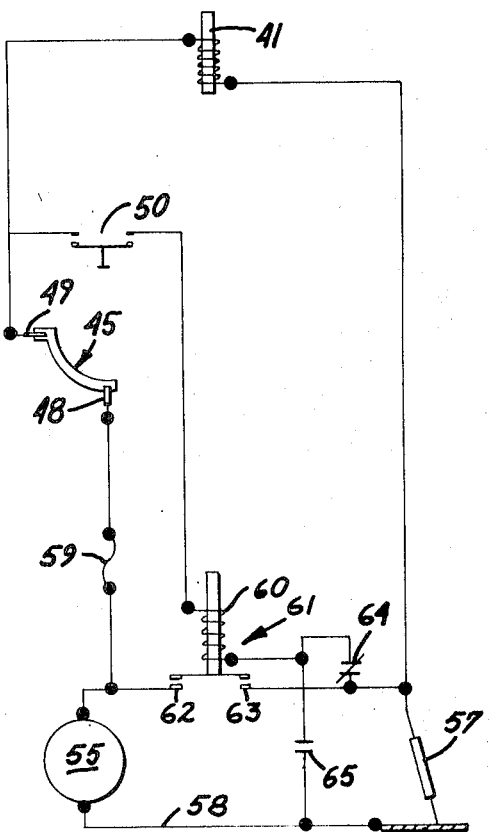
INVENTOR.
JOHN F. FINGER
BY
Merchant & Gould
ATTORNEYS United States Patent Office 3,719,793
Patented Mar. 6, 1973

3,719,793
WELDING HELMET
John F. Finger, 308 S. 3rd St., Beresford, S. Dak. 57004
Filed Mar. 4, 1971, Ser. No. 120,811
Int. Cl. B23k 9/32
U.S. Cl. 219—147                                    4 Claims

ABSTRACT OF THE DISCLOSURE

A welding helmet including a head harness and shield with a work viewing opening therethrough and a dark glass slidable between a position overlying the opening and a position adjacent the opening. The dark glass is biased into the overlying position by a spring and maintained in the adjacent position by a latch operated by a solenoid. A rotary switch is mounted between the shield and the harness and electrically connected in series with the solenoid between a power source and the welding electrode. A push-button switch is mounted on the shield for operation by the dark glass as the glass moves into the overlying position and is electrically connected in series with the coil of a relay between the power source and the welding electrode. Sets of contacts of the relay are connected directly between the power source and the welding electrode.

BACKGROUND OF THE INVENTION

Field of the invention

In electric arc welding, it is a well-known fact that the arc can permanently damage eyes and is even somewhat harmful to the skin. Welding helmets are, therefore, utilized which completely cover the face and have a viewing opening therethrough covered with a very dark glass to greatly reduce the radiation from the arc. Because the glass covering the opening is so dark, it is impossible to see the work, except when actually welding. Therefore, it is common to raise the helmet and place the welding electrode adjacent the work. The helmet is then lowered and the electrode is touched to the work to complete the electric circuit and produce the welding arc. In many instances, however, an arc is drawn before the helmet is in place and at letast slight damage to the eyes occurs.

Description of the prior art

Many prior art patents have been issued which describe helmets having a movable dark glass plate therein and an electric circuit wherein the dark glass plate is moved into a position overlying the viewing opening upon depressing a push-button to complete the electric circuit or upon touching the electrode to the work. In each of the devices described in the prior art patents, the circuitry is either extremely complicated or a specially wound relay is required which will not operate when a low level of current is passing therethrough but will operate when a high level of current is passing therethrough. These relays are expensive and difficult to manufacture and are susceptible to error when shorts and the like occur in the electrical circuitry. In each apparatus, it is essential to adjust the timing so that the dark glass is in front of the eyes prior to the striking of an arc between the welding electrode and the work.

SUMMARY OF THE INVENTION

The present invention pertains to an improved welding helmet including a head harness and shield rotatably attached thereto with an eye protective piece movable between a viewing opening through the shield and a position adjacent thereto, a first switch mounted between the shield and the harness for operation when the shield is in the correct position, latch means operable with an electric solenoid for maintaining the eye protective piece adjacent the opening and spring means biasing the eye protective piece into overlying position over the opening when the solenoid is energized, push-button switch means positioned to operate when the eye protective piece moves into the overlying position and connected in series with the coil of a relay between a power source and the welding electrode, the solenoid and the first switch means being connected in series between the power source and the welding electrode and contacts of the relay being connected directly between the power source and the welding electrode.

It is an object of the present invention to provide an improved welding helmet which must be in the correct position before welding can be accomplished.

It is a further object of the present invention to provide electrical circuitry with the welding helmet which insures that a welding arc cannot be struck until the protective eye piece is positioned in front of the eyes.

It is a further object of the present invention to provide an improved welding helmet which is simple to manufacture and use and which is relatively inexpensive and failure-free.

These and other objects of this invention will become apparent to those skilled in the art upon consideration of the accompanying specification, claims and drawings.

BRIEF DESCRIPTION OF THE DRAWINGS

Referring to the drawings, wherein the like characters indicate like parts throughout the figures:

FIG. 1 is a view in rear elevation of the improved welding helmet, portions thereof broken away;

FIG. 2 is a sectional view as seen from the line 2—2 in FIG. 1;

FIG. 3 is an enlarged sectional view as seen from the line 3—3 in FIG. 1; and

FIG. 4 is a schematic diagram of the electric circuitry associated with the improved welding helmet of FIG. 1.

DESCRIPTION OF THE PREFERRED EMBODIMENTS

In the figures the numeral 10 generally designates a head harness, which includes a portion 11 adapted to encircle the upper part of the head and a portion 12 which is affixed to the portion 11 and extends from one side of the head upwardly over the top thereof to the other side. The head harness 10 is pivotally affixed, at the junctions of the portions 11 and 12 on either side of the harness 10 at positions designated 13 and 14, to a shield 15. The shield 15 is constructed to cover substantially the entire face and to extend backwardly along the sides of the head to prevent rays from entering the shield 15 in any direction. A generally rectangularly shaped opening 16 is provided in the shield 15 at approximately eye level so that a wearer may view his work. Clear glass is provided in the opening 16 for protection. In normal usage, the head harness 10 is positioned on the head and the shield 15 is rotatable about the pivot point 13 and 14 between a position in front of and overlying the face and a position generally above the head.

The edges of a generally rectangularly shaped plate 20 are bent inwardly and affixed to the inner surface of the front portion of the shield 15 so that the major portion of the plate 20 is parallel with and spaced from the front inner surface of the shield 15. The plate 20 cooperates with the front inner surface of the shield 15 to form an elongated slot-like enclosure 21. The vertical height of the enclosure 21 is substantially greater than the vertical height of the opening 16 and the enclosure 21 extends from slightly above the opening 16 to a substantial distance therebelow. An opening 22 is provided in the plate 20 in alignment with the opening 16 and approximately coextensive therewith. The slot-like enclosure 21 forms a track to guide a generally rectangularly shaped glass holder frame 23 during vertical movements thereof. While the plate 20 is affixed to the inner surface of the shield 15 to improve the outer appearance and symmetry thereof, it should be understood that the plate 20 might be affixed to the outer surface of the shield 15 and the apparatus to be explained presently would then be on the outside of the shield 15.

The glass holder frame 23 has affixed therein a rectangularly shaped piece of light reducing, eye protective material 24, which generally is composed of very dark glass. The overall dimensions of the eye protective material 24 and the opening through the frame 23 are slightly larger than the inner dimensions of the openings 16 and 22 so that the eye protective material 24 is at least coextensive with the openings 16 and 22 when the frame 23 is in an uppermost position in the enclosure 21. An elongated rod 30 is threadedly engaged into the lower edge of the frame 23 and extends through an opening in the lower edge of the enclosure 21, formed by the bend in the edge of the plate 20, and downwardly through an opening 31 in the shield 15 so as to extend vertically downwardly through the shield 15 generally beneath or adjacent the chin of a wearer. The lower end of the rod 30 is bent horizontally outwardly from the shield 15 and a handle 32 is affixed thereto for manual vertical movements of the frame 23. A compression spring 33 is coaxially engaged over the rod 30 between the lower edge of the frame 23 and the lower edge of the plate 20, within the enclosure 21. The compression spring 33 biases the frame 23 upwardly toward the position wherein the eye protective material 24 is aligned with the openings 16 and 22. It should be understood that other means might be utilized for biasing the frame 23 into the upward position but the present apparatus is illustrated because of its simplicity.

Latch means, generally designated 35, are associated with the frame 23 and serve to retain the frame 23 in a lower, or transversely displaced, position. The latch means 35 includes a first portion 36 which is a generally Z-shaped piece of metal having one arm affixed to the lower edge of the frame 23 and the other arm extending horizontally in spaced relation below the lower edge of the frame 23 to form a shoulder. The latch means 35 further includes a second portion 37 having a generally L-shaped configuration with an arm 38 and a second perpendicular arm 39. The portion 37 is pivotally mounted at the junction of the arms 38 and 39 and just below the lower edge of the plate 20, so that the arm 38 is generally vertical and extends upwardly through an opening in the plate 20 into the enclosure 21 and the arm 39 extends generally horizontally adjacent to the lower edge of the plate 20. The upper end of the arm 38 has a downwardly directed shoulder 40 formed therein, and the arm 38 is positioned so that the lower horizontal arm of the portion 36 engages the downwardly directed shoulder 40 of the arm 38 when the frame 23 is moved transversely downwardly into a position wherein it does not overlie any portion of the openings 16 and 22. The portion 37 engages the portion 36 of the latch means 35 and retains the frame 23 in the lower position against the bias of the spring 33. An electrical solenoid 41 is mounted in the enclosure 21 so that the movable core 42 thereof extends out of the enclosure 21 downwardly and is affixed to the outer end of the arm 39. Energization of the solenoid 41 causes upward movement of the core 42 and pivotal movement of the portion 37. As the portion 37 pivots the shoulder 40 disengages the lower horizontal arm of the portion 36 and allows the frame 23 to move upwardly under the bias of the spring 33 into alignment with the openings 16 and 22.

A first switch, generally designated 45, is affixed between the head harness 10 and shield 15 to operate whenever the shield 15 is correctly positioned over the face of the wearer. In the present embodiment the first switch 45 is a wafer-type switch having an outer annular shaped disc 46 affixed to the shield 15 and a coaxially mounted inner disc 47 affixed at the point 14 to pivot with the head harness 10. The inner disc 47 has a conducting copper ring concentrically formed thereon which is in continual contact with an electrical connection 48 and a radially outwardly extending electrically conducting protrusion formed as a part of the copper ring, which engages an electrical connection 49 only when the shield 15 is in a downwardly pivoted position relative to the head harness 10. Thus, whenever the shield 15 is positioned in front of the face of the wearer an electrical circuit is completed between the electrical connections 48 and 49 and whenever the shield 15 is rotated from this position the circuit between the electrical connections 48 and 49 is broken. A push-button type normally open switch 50 is affixed in the plate 20 adjacent the upper edge thereof so as to extend into the enclosure 21. The push-button switch 50 is positioned to be engaged by the upper edge of the frame 23 when the frame 23 moves upwardly into alignment with the openings 16 and 22. The electrical connections of the switches 45 and 50 and the solenoid 41 are illustrated in FIG. 4.

Referring to FIG. 4, the numeral 55 designates a source of electric power for arc welding, the numeral 56 designates work being welded and the numeral 57 designates a welding electrode. The source of electric power 55 is connected to the work 56 by means of a common or ground line 58, in the usual manner. The opposite side of the source of electric power 55 is connected through a fuse 59 to the electrical connection 48 of the switch 45. The electrical connection 49 of the switch 45 is connected through the solenoid 41 to the welding electrode 57. The electrical connection 49 of the switch 45 is also connected through the normally open push-button switch 50 to one side of a coil 60 of a relay generally designated 61. The relay 61 has two sets of high current conducting contacts 62 and 63, a set of normally closed contacts 64 and a set of normally open contacts 65. The opposite side of the coil 60 is connected through the set of normally closed contacts 64 to the electrode 57 and through the set of normally open contacts 65 to the ground line 58. The opposite side of the source of electric power 55 is also connected through the set of contacts 62 and the set of contacts 63 to the electrode 57.

In operation, a welder normally pivots the shield 15 into a position generally overlying his head to prepare the work 56 for welding. The shield 15 is then pivoted downwardly into a position in front of the welder's face, which closes a circuit through the switch 45. At this time, the frame 23 and eye protective material 24 are in the lowermost position with the latch means 35 engaged. The welder can view the work 56 through the openings 16 and 22 and can clearly see to apply the electrode 57 to the work 56. When the electrode 57 touches the work 56 a circuit is completed from one side of the source of electric power 55 through the ground 58 to the work 56, through the electrode 57, through the solenoid 41 and the switch 45 to the opposite side of the source 55. Since current is flowing through the solenoid 41, it is energized and the portion 37 of the latch means 35 is pivoted to disengage the latch means 35 and allow the frame 23 and eye protective material 24 to move upwardly, under the bias of the spring 33, into its uppermost position in alignment with the openings 16 and 22. At this time the welder's eyes are protected by the eye protective material 24 so that they will not be damaged when an arc is drawn between the work 56 and electrode 57. When the frame 23 moves into its uppermost position the push-button switch 50 is engaged and closed so that a circuit is completed from one side of the source 55 through the ground 58 to the work 56 and from the work 56 through the electrode 57, normally closed contacts 64, coil 60, push-button switch 50 and through switch 45 to the opposite side of the source 55. When current passes through the coil 60 the relay 61 is energized closing the high current carrying sets of contacts 62 and 63 and completing a welding circuit from one side of source 55 to the work and from the other side of source 55 through the sets of contacts 62 and 63 to the electrode 57. Sufficient current is now supplied to the electrode 57 to draw an arc between the electrode 57 and the work 56. When the relay 61 is energized the normally closed contacts 64 open and the normally open contacts 65 close to complete a circuit for the coil 60 without going through the work 56 and electrode 57. Thus, the relay 61 is maintained in an energized state even though the welding electrode 57 is temporarily removed from the work 56 and the sets of contacts 62 and 63 are not chattering or opening and closing as the welder welds. When the welder has completed his welding operation and disengaged the electrode 57 from the work 56, he simply grasps the handle 32 and pulls the frame 23 and eye protective material 24 downwardly until the latch means 35 engages.

Thus, an improved welding helmet is disclosed which incorporates greatly simplified electrical circuitry and apparatus for allowing a welder to see the work and for protecting the eyes from flashes. Further, the electrical circuitry incorporates simple components which do not require different levels of current therethrough and, therefore, are not subject to failure or inadvertent operation. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A welding helmet, adapted to be connected into an electric welding circuit including a source of electric power, a piece of work connected to said source by a common line and a welding electrode, comprising:
   (a) a harness adapted to fit the head of a welder;
   (b) a shield rotatably attached to said harness for movements between a protective position in front of the face and a raised position generally above the head, said shield defining an opening therethrough for viewing work;
   (c) a first switch mounted in cooperating engagement between said harness and said shield for operating said first switch when the shield is moved into the protective position;
   (d) a light reducing, eye protective piece of material having dimensions at least as large as the opening in said shield mounted on said shield for movements between a first position overlying the opening in said shield and a second position spaced transversely from the opening;
   (e) a spring engaging said protective piece and providing a bias thereon urging said protective piece from the second and toward the first position thereof;
   (f) latch means including a first portion affixed to said protective piece and a second portion affixed to said shield for retaining said protective piece in the second position when said first and second portions are engaged and releasing said protective piece when said first and second portions are disengaged;
   (g) electric solenoid means affixed to said latch means for disengaging said first and second portions upon energization of said solenoid means;
   (h) second normally open switch means affixed to said helmet and positioned to close upon movement of said protective piece into the first position;
   (i) electric relay means having at least one set of contacts and a coil adapted to be energized to operate said contacts responsive to closing of said second switch means; and
   (j) electrical conducting means for connecting said first switch and said solenoid means in series between the welding electrode and the source of electric power, for connecting said second switch means and said coil of said relay means in series between the welding electrode and the source of electric power, and for connecting said set of contacts of said relay means between the welding electrode and the source of electric power.

2. A welding helmet as set forth in claim 1 wherein the first switch includes a rotary wafer-type switch.

3. A welding helmet as set forth in claim 1 wherein the second switch means is a push-button type mounted on the shield so as to be engaged by the protective piece as it moves into the first position.

4. A welding helmet as set forth in claim 1 wherein the electric relay means includes in addition a normally closed set of contacts connected in series with the second switch means and the coil of the relay means between the welding electrode and the source of electric power to energize said coil responsive to closing of said second switch means, and a normally open set of contacts connected in series with the second switch means and the coil of the relay means across the source of electric power to complete a holding circuit for the coil of said relay independently of said electrode.

References Cited

UNITED STATES PATENTS

| | | | |
|---|---|---|---|
| 2,904,669 | 9/1959 | Toebe | 219—147 |
| 2,778,928 | 1/1957 | Morrell | 219—147 |
| 2,418,415 | 4/1947 | Leser | 219—147 X |
| 2,471,719 | 5/1949 | Broffitt et al. | 219—147 |

JOSEPH V. TRUHEE, Primary Examiner

L. A. SCHULTZMAN, Assistant Examiner